United States Patent

[11] 3,614,388

| [72] | Inventor | Aubrey C. Robinson<br>La Grange, Ga. |
|---|---|---|
| [21] | Appl. No. | 48,401 |
| [22] | Filed | June 22, 1970 |
| [23] | | Division of Ser. No. 834,727, June 19, 1969, Pat. No. 3,529,358, which is a division of application Ser. No. 488,886, Sept. 21, 1965, now Patent No. 3,467,815. |
| [45] | Patented | Oct. 19, 1971 |

[54] ELECTRIC HEATING OVEN SYSTEM
2 Claims, 23 Drawing Figs.

[52] U.S. Cl. .................................................. 219/400,
34/26, 34/222, 38/144, 126/21 A, 219/413
[51] Int. Cl. .................................................. F27d 11/02
[50] Field of Search .......................................... 219/400,
413; 34/26, 222; 38/144; 126/21 A

[56] References Cited
UNITED STATES PATENTS
2,411,712  11/1946  Joyce .......................... 34/207

| 3,214,566 | 10/1965 | Wilson .......................... | 219/400 |
| 3,259,994 | 7/1966 | Klinkmueller et al. ........ | 34/26 |
| 3,262,216 | 7/1966 | Dugger.......................... | 34/26 |
| 3,368,062 | 2/1968 | Gramenius et al. ............ | 219/400 |
| 3,529,358 | 9/1970 | Robinson ..................... | 34/26 |

*Primary Examiner*—Volodymyr Y. Mayewsky
*Attorney*—Linton & Linton

ABSTRACT: An electric heating oven system for overcoming an erroneous and inefficient heat treatment of materials such as in the deferred curing of textile garments and pieces of goods, metal, wooden, lacquered surfaces, ceramics, and other objects or materials, where it is known that the product heat of materials undergoing heat treatment should be brought up to the last level equal to that of the environmental temperature level which is used to impose the head treatment upon said material without uncontrolled underheating and/or overheating said material in the process, and where the application of such product head should be made in a gradual manner in order to hold peak heat levels to the minimum level required for given results.

FIG. 1.

INVENTOR.
AUBREY C. ROBINSON,
BY
Linton and Linton
ATTORNEYS.

PATENTED OCT 19 1971 3,614,388

INVENTOR.
AUBREY C. ROBINSON,
BY
Linton and Linton
ATTORNEYS.

PATENTED OCT 19 1971 3,614,388

INVENTOR.
AUBREY C. ROBINSON,

BY Linton and Linton

ATTORNEYS.

INVENTOR.
AUBREY C. ROBINSON
BY
Linton and Linton
ATTORNEYS.

FIG. 22.

INVENTOR.
AUBREY C. ROBINSON,
ATTORNEYS.

ELECTRIC HEATING OVEN SYSTEM

The present application is a division from my copending application, Ser. No. 834,727 filed June 19, 1969, now U.S. Pat. No. 3,529,358, which is a division from my application, Ser. No. 488,886 filed Sept. 21, 1965, now U.S. Pat. No. 3,467,815 issued Sept. 16, 1969.

The present invention relates to an electric heating oven system for the heat treatment of various objects, but more particularly, for the cooking of meat and other food products by passing currents of air thereover.

It is an object of my invention to provide an electric heating oven system which can be precisely controlled to apply uniformly required heat volume at desired temperature levels simultaneously to a number of objects to be cooked, such as, large roasts or other objects.

Another object of my invention is to provide an electric oven in which heat is applied to the material to be heated or cooked in heated streams of air or vapor and not by direct radiation from heating elements.

Still another object of my invention is to provide shielding jackets to enclose the heating elements through which a current of air circulates while preventing direct radiation of heat from the heating elements on to the objects to be heat treated.

A further object of my invention is to provide elimination of all storage heat usually functioning in ovens as heat sink and used to reduce temperature by relating mass of metal volume to volume of heat generated, to receive heat when the oven is overheating, and to re-release heat to the oven when the oven is underheating, thus, providing a thermal delay action in the heat environment in which temperature-sensing devices are placed.

A further object of my invention is to provide by the absence of any thermal delay characteristics inside the oven, itself, a sensing environment which is instantly responsive to generation of out-going heat, and, conversely, to which variable regulation for heat generation is also instantly responsive to sensing devices.

A further object of my invention is to provide a method for temperature sensing response controlled switching "on" and/or "off" heating coils of varying heat-generating capacities, and as located together in each heat generating assembly, to operate singly or in combination with each other so that heat volume may be varied up or down in a continuous heat-generating process, without the use of expensive variable transformers or saturables and the elaborate control mechanisms required therefor.

A further object of my invention is to provide a method for a compound temperature sensing response operation of varying both the volume of circulating air and the volume of heat generation in relation to each other to regulate the volume of heat required to maintain a stabilized cooking or heating process at desired temperature levels, as preset for the high- and low-temperature points, namely, the beginning temperature and the ending temperature of the air in its passage around and by the cooking objects where heat volume generated will be precisely that which is absorbed by the meat.

A further, and very important object of my invention is to provide a safe method for low heat cooking where the ending temperature of the air passage over the meat can be reduced to the lowest point possible to still prevent the multiplication of various bacterial cultures involved in meat or food spoilage.

A further object of my invention is to eliminate the necessity for turning meat while in the cooking process for purposes of preventing overcooking at various portions, or for crusting control, by reversing the flow of air circulation at desired point or points in the cooking process.

Still another very important objective of this invention is to make applicable to textile goods, as well as to meat and other foods, a heat treatment resulting from even generation and dispersal of heat, with the compound sensing system controlling both airflow and heat generation, to protect delicate cotton fibers, as blended with synthetics, from the ravages of both unintentional overheating, and from peak heat intensities fixed higher than necessary to protect against unintentional underheating.

Another objective, in connection with the objective just outlined, is to provide an arrangement of plural separate, and independently operating, units of heat treatment, in series, one unit with another, to accommodate a tempering heat treatment procedure whereby the heat intensity imposed on textile goods can be imposed in stages of intensity levels for each succeeding unit until peak heat intensity for curing is reached, and after the curing exposure, where the heat intensity necessary for curing as applied in the textile goods can conversely, be withdrawn therefrom in stages with a brief time interval in each unit to permit some seasoning of the cure as respective lower heat intensities are reached successively as down to ambient temperature.

Still another objective of this invention, is that by removing economic hazards formerly met from underheating of the textiles in conventional ovens, to reduce the need for peak heat intensity levels presently used, so that lower peak heat intensity levels can be used which can result in lowering the proportion of synthetic materials and bonding additives in the blend mix with cotton materials necessary for permanent shape memory in wash and wear goods.

Still another objective of this invention is to widen the scope of materials and products which may undergo heat treatment in this manner, to include products of metals, ceramics, wood, chemical compounds, lacquers, etc.

My invention will be understood from the following specification and the accompanying drawings in which.

Figure 1:
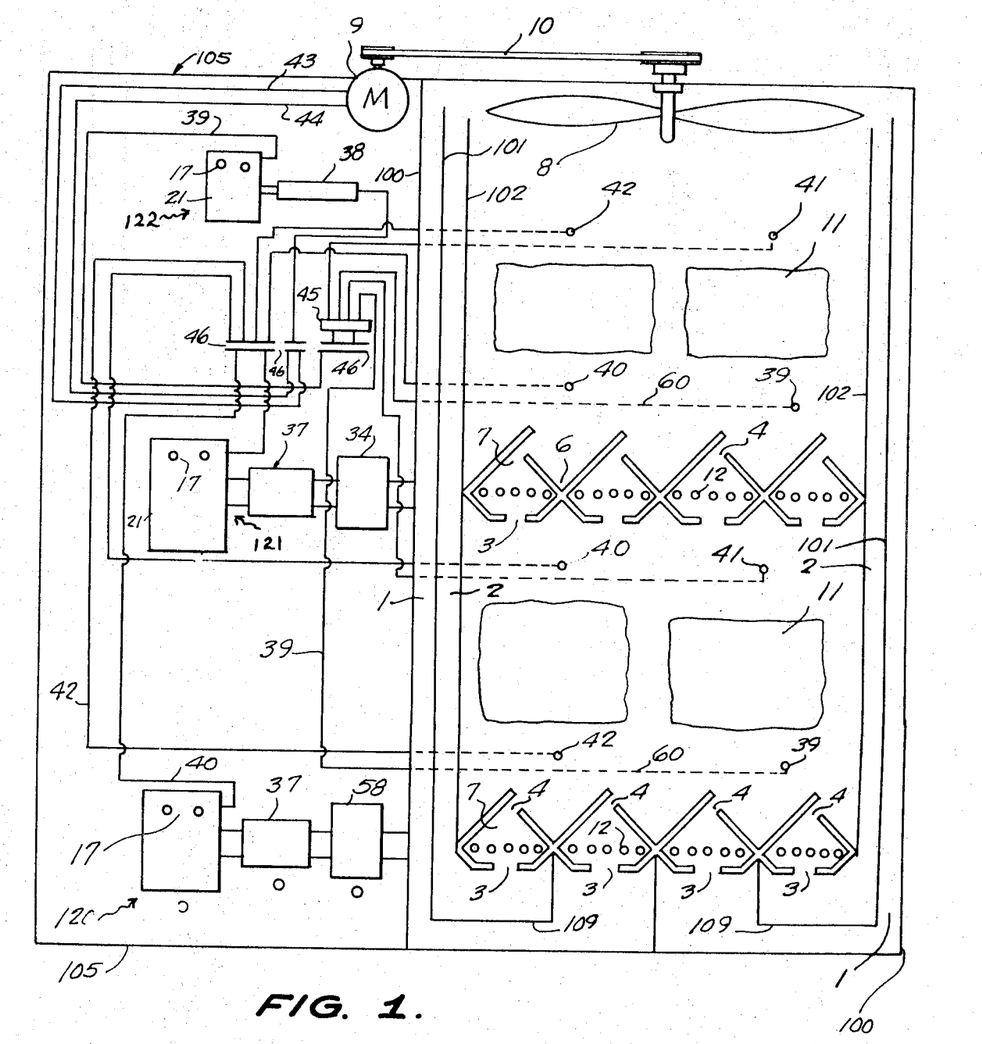
FIG. 1 shows, on the right side, a cross-sectional view of the arrangement of the fixed controls as positioned in the interior of an oven space, and, at the left side a blownup view of the panel on which the variable controls are mounted, with box configurations of these individual control units, or specialty electrical components, as placed, each one, adjacent to the component it controls, and, also, line configurations for each set of sensing elements, two thermistors in each set with circuit wires therefrom, as control lines to sensing locations so indicated back to control boxes on control panel.

Referring to the drawings in details, in FIG. 1, 1 is a channel within the inner wall of oven 100 and partition 101 of the oven through which a current of air generated by fan 8 passes downward to an aperture 3 through which the current of air passes upward through jacket enclosure 7 around heating coils 12 and out through an aperture, or, vent 4, and on upward through the oven, as, simultaneously a similar current of air also generated by fan 8 passes downward through channel 2 within partition 101 and partition 102 to a similar air aperture 3 and upward through a similar jacket 7 around heating coils 12 and out through similar aperture or vent 4 and upward through the oven; intermixing as necessary the current of air emitted upward from channel 1. Intermixed or composite air current 1 from the aforementioned channels and companion outer and inner channel 1 and 2 at the right side of the oven continue upward, and around cuts of meat 11; to another set of heating jackets 12 at an upper horizontal level in the oven, whereupon the composite current of air pushes in through four respective apertures 3 of the four heating jackets 7 and around heating coils 12 in second level jackets and around cuts of meat 11 positioned in the upper level compartment of the oven and finally returns to fan 8, or bounces to fan 8 by plate 103, shown also in FIG. 13, and thus to repeat circulation cycle over and over again. Channels 1 and 2 are equal volume channels, and heating jackets 7 formed by two adjacent insulated wing throughs 6 each with an insulated wing heel shield 5, are mounted in both lower and upper levels of mounting in such a manner as to form equal-distributive volume units for intake and dispersal of air in relation to horizontal void of the oven, and in relation to symmetrically placed cuts of meat 11; fan 8, as it revolves, traverses a circle for the entire horizontal span of the oven void, and together with plate 103, completes an air circulatory system whereby air is dispersed in uniform volume as related to the inner space of the oven and its cooking contents.

Figure 8:
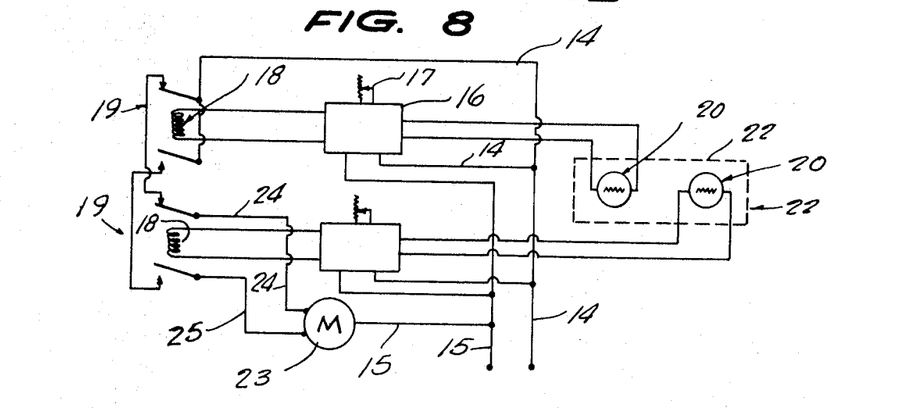
FIG. 8 shows details of a temperature-sensing response control switching system which is represented as a box in FIG. 1.
Figure 10:
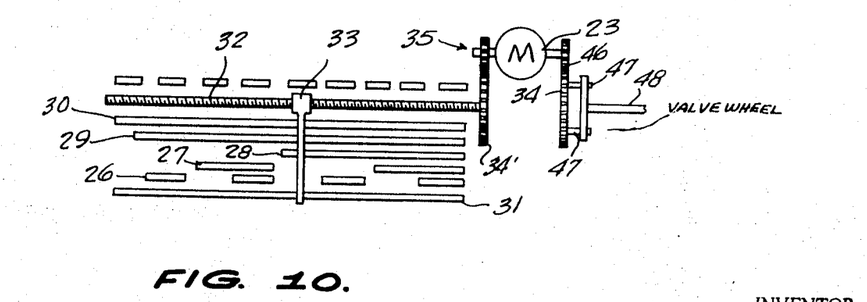
FIG. 10 shows details of the program switch, which is represented as a box in FIG. 1.
Figure 15:
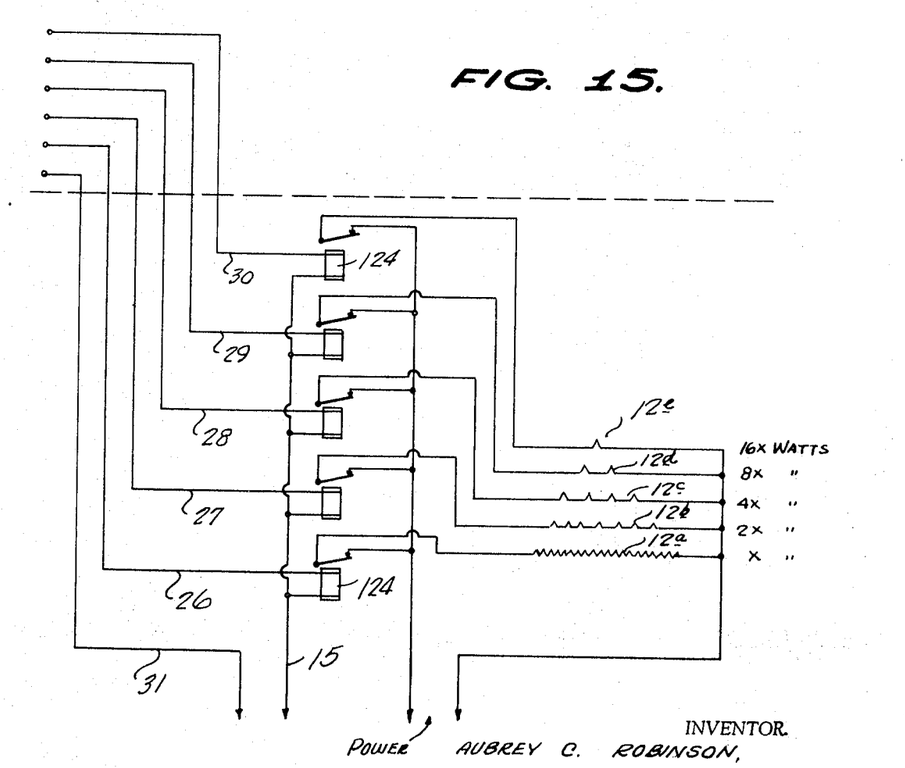
FIG. 15 shows elements of variable heat generation output of heating elements located in one location in one heating jacket, and electromagnetic power switches therefor, which electromagnetic power switches are represented as a box in FIG. 1.
Figure 16:
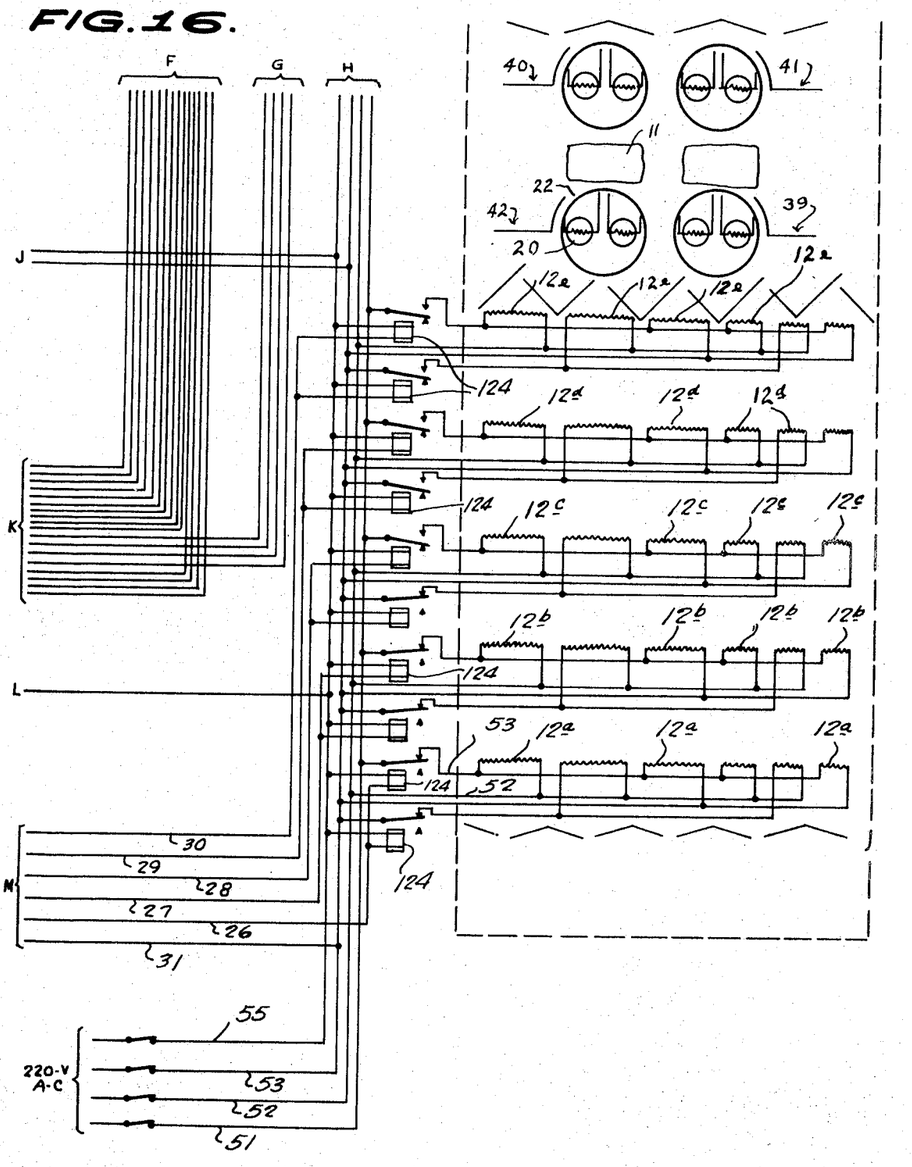
FIG. 16 shows, at the bottom, the elements of variable heat generation shown in FIG. 15 extended to plural locations in respective heating jackets from one group of circuits, with the power load of each circuit of heaters divided equally by each phase of a three phase circuit, and electromagnetic power switches therefor, which electromagnetic power switches are represented as a box in FIG. 1. And further shows at the top thermistor elements in the control lines positioned in one lower cooking compartment as shown in FIG. 1.

Referring now to parts of the drawings which relate to the heating system, in function sequences, plural electric heating coils 12 with schematized variance in wattage capacity 12*a*, 12*b*, 12*c*, 12*d*, 12*e* (FIG. 15) are used together in respective locations or jackets, and positioned and mounted as shown in FIGS. 1, 4, 5, 3, 7, 9, 11, 15 and 16 etc. and are energized directly from 220–236 volt "power-in" AC lines shown in detail in FIG. 16. Power switching is controlled by respective electromagnetic switches 124, FIG. 15, which are actuated by temperature-sensing response mechanisms and systems which are referred to separately, as follows:

FIG. 8 shows the mechanisms or electrical components used together as a method for producing motor rotation action as controlled by temperature-sensing responses, which are: two identical double pole electromagnetic switches, 18, where one pole of each switch is in reverse contact position from that of the other pole of the same switch, namely, one pole open when switch is deenergized, and closed when switch 18 is energized, and open when switch 18 is deenergized. There are two jumpers 19, one each connecting like poles of the two switches 18 together; two identical transistorized Wheatstone bridge type controllers 16, such as Fenwall Commercial type of equivalent, and each controller with its individual sensing circuit to a thermistor-sensing element, 20, and each controller, 16, with its individual variable resistor, 17, or potentiometer, which is calibrated in temperature setting. Each controller is powered from 110 volt AC leads 14+15 and actuates a separate one of the two double pole electromagnetic switches, 18. One lead coming also from tap off lead 14 of volt AC power circuit has a T connection to both movable contactors of one electromagnetic double pole switch; and the two lugs, or stationary contacts, of like poles of each electromagnetic switch are connected sequentially together by respective jumpers 19; where the second electromagnetic switch 18, not connected directly to power lead 14 has off-feed leads 24–25 to operate as follows; movable contactor of switch 18 which is closed when its switch is deenergized is connected by power lead 25 to reversible motor 23 at a coil position to complete power circuit to motor 23 so that the motor rotates in clockwise direction; movable contactor of the same lower electromagnetic switch 18 closed when its switch 18 is energized, is connected by lead 24 of the same motor 23 to complete the power circuit at a coil position so that the motor rotates in a counterclockwise direction. With mechanism so arranged as described above, a method for the operation of a temperature-sensing response is evolved as follows: The variable resistors 17 of the two controllers 16 are set close but not quite together, down to within 3° F. apart: the sensing elements 20 of both controllers 16 are placed in the same temperature environment; each of the two controllers 16 has a 2° differential between "make" energized, and "break" deenergized; if and when the temperature is at or below or falls to 1° F. below the preset temperature of lower set controller 16, that controller energizes its electromagnetic switch and lead 24 to motor 23 is energized and causes motor 23 to rotate in a clockwise direction which it continues to do until the temperature rises to or above 1° above the preset temperature of the lower set controller 16, whereupon the controller 16 then "breaks" or denergizes and opens switch to the lead 24 and the motor stops; if and when the temperature rises to or above 1° F. higher than the higher preset temperature controller 16, that controller "breaks" and deenergizes, where with the other controller already deenergizes at a lower temperature, and the like pole there already closed, the circuit through lead 25 is closed to motor 23 which begins to rotate in counterclockwise direction which it continues to do until the temperature falls to or below 1° F. below the higher preset temperature controller, then reaching or falling to the temperature the controller again energizes its switch 18, whereupon the movable contact is opened to lead 25 and motor 23 stops; thus results higher preset temperature controller controls for counterclockwise rotation of motors 23, and the lower preset temperature controller controls the clockwise rotation of motor 23, with the impossibility for both controls to operate simultaneously, and where both of leads 24 25 are open circuit when one controller is energized and the other controller is deenergized, with the intervening temperature band between the two control points providing no motor action, and, thus, becomes the "found" band stabilization of. Controller depicted in FIG. 8 which is represented in box 21 in FIG. 1. Motor 23 as shown in FIG. 10, as previously shown in FIG. 8, may drive pinion gear 35, and, in turn, drive ring gear 34 and rotate threaded shaft 32 and move contact arm 33 to the right, or left, laterally across the switch positions of the program switch, FIG. 10, and the array of contact strips to switch on" or "off" singly, in various combinations, contact strips, and control leads, 26, 27, 28, 29, and 30 from the current supply on bus bar 31, to actuate respective one or ones of electromagnetic power switches 124 in FIGS. 15 and 16 of the respective circuits of parallel connected coils, where each coil in a circuit, as shown in FIG. 16 is of the same wattage capacity but with a schematized variance in wattage rating of coils between that of one circuit and that of another circuit. As an example, as shown in FIGS. 15 and 16, the circuit with the lowest rating, 12a of X watts, 12b 2x watts, 12c 4X watts, 12d 8x watts, and 12e 16X watts, with control leads 26, 27, 28, 29, and 30 respectively controlling electromagnetic power switches of these circuits of heaters, and an array of contact strips from which these respective control power leads 26–30 come, are positioned in such a manner across the face of the program switch 10, that, starting with each switch position (for contact strip—arm 35) starting with the "off" position, where no contact strips are positioned, to the next right position with a strip for 12A circuit only positioned, each succeeding switch positioned to the right have contact strips positioned either singly or in combination with each other, to, by manipulating electromagnetic power switches 124 in FIG. 15 and 16, increase wattage output switched to an array of electric heating coils in one heating location or heating jacket by X watts for each switch position step by step through 31 switch positions, from X watts up to 31X watts for the last switch position, thus to implement a method of increasing or decreasing wattage output in clusters of heaters by moving, in a temperature responsive power driven way, the contact arm 33 to the right or left, and thus increase or decrease gradually X watts at each change of switch position of contact arm 35, and without interrupting a continuous heat generation. Provision must be made in the gear ratio between motor pinion 35 and ring gear 34 for the threaded shaft to turn slowly enough to move contact arm 33 slowly enough from one switch position, for heating elements turned off to cool, and these heaters turned on to heat and sensors to register therefrom before the next switch position involved is reached.

The Program switch, as shown in FIG. 10 with its movable contact arm 33 as positioned temperature responsively from action of controller as developed in FIG. 8, through control motor 23, transmits temperature response on a reaction basis to determine the output of heat generation through a system of variable heat generation, with use of electric heating elements as shown in FIG. 15 of schematized variance in wattage ratings, one element from another, as located together in one heating jacket so as to act singly, any one of them, or to act in various combinations of heating elements, as finally controlled by the program switch of FIG. 10 as represented by box 37 in FIG. 1. Details of elemental operation of the variable heat output generation is shown in FIG. 15, where the instrument of control is the remote control of respective electromagnetic switches 124 by the program switch FIG. 10, (or box 37) through contact strips as arrayed on the switch face, through control power circuit leads 26, 27, 28, 29, and 30, where any variation by X watts input can be switched in by signals or combination switching in and out of electromagnetic power switches 124 which brings about heat output variances from X watts to 31X watts, X watts at each step by individual and combination actions of heating elements 12a, 12b, 12c, 12d, and 12e.

In the lower portion of FIG. 16, an extension is made of the system of variable heat output generation as developed in FIG. 15 to plural heating jacket locations involved in one heat control entity, with circuitry arrangement for distributing power load by full powered heaters, one or more heating elements; to each phase each having three one-third power heating elements for each circuit divided one each for the three phases: power leads 51 and 52 comprise one phase, 52, and 53 another, and 51 and 53 the final phase. Control leads 26, 27, 28, 29, and 30 and all five respective sets of electromagnetic switches 124 taken together are represented as box 38 in FIG. 1. The upper portion of FIG. 16 shows thermistor-sensing details 20 and 22 as developed in FIG. 8 extended to the operating location in the oven control system, but each pair of thermistors 22 are represented as control lines viz. 40, 42, for heat generation, and 39 and 41 for airflow regulation. Heating elements and these control lines are shown graphically in drawings where they are used.

Figures 13, 14:
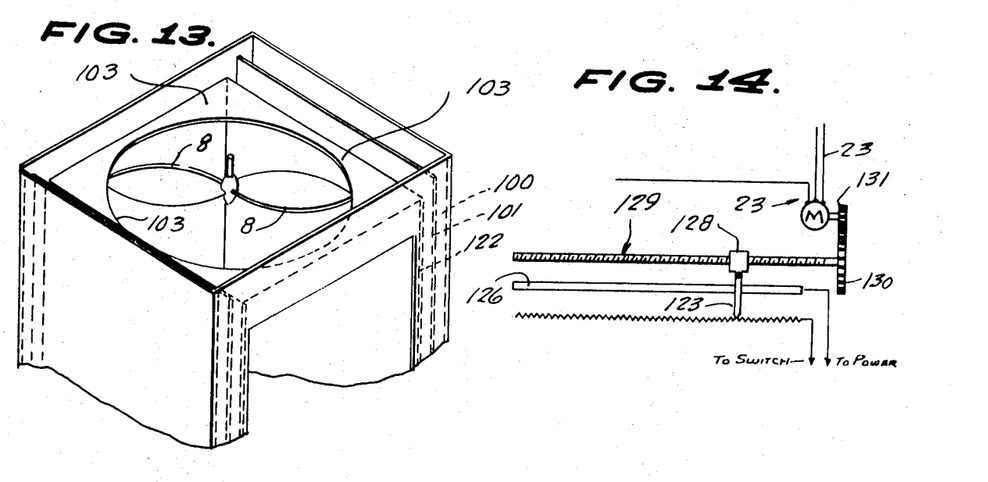
FIG. 13 shows a perspective view of the fan traverse cutout of the fan plate separating the cooking compartment from air heat above the fan, and air channels opening therein.
FIG. 14 shows details of linear resistance variable regulator in series with power feed to fan motor, and represented as a box in FIG. 1.

Based upon characteristics of the oven and its circulatory system as shown in FIG. 1, as heretofore related point by point where it is shown that air can be circulated through and dispersed evenly within the oven enclosure, and based upon the coincidental even dispersal of heat by equal capacity of, and even generation and delivery of heat, one inch with another inch, along the length span of each of the heating jackets through which the circulating air passes, and based upon the fact, therefore, that no storage of heat can occur anywhere in the operating part of the oven since it cannot build up to any temperature level higher than that of the heated air itself with which it is in constant heat exchange and based further upon the facility for varying heat generation up and down by use of plurality circuits of heating coils, and a program switch controlling same from temperature-sensing responses, as interpreted by sensing control system as shown in FIG. 8, which has also been related heretofore, and based further upon the facility for increasing or decreasing the rate of flow of air circulation through the oven as controlled by a variable resistor system as shown in FIG. 14, in series with the power feed to the fan motor propelling the fan from temperature-sensing responses as interpreted also by a duplicate unit of sensing control system as shown in FIG. 8, a method can be provided for a compound temperature sensing response operation of varying both the volume of circulating air and the volume of heat generation in relation to each other, which can be employed to automatically supply the volume of heat required to maintain a stabilized cooking process of a given mass of meat (as loaded in the oven) or other cooking objects, at desired temperature levels, as preset for the high- and low-temperature points, namely the beginning temperature and the ending temperature of the air in its passage around and by the meat or other cooking objects. Controls for employing this method are partly provided inside the oven as shown in FIG. 1 and partly provided by auxiliary components used and controlled outside the oven as shown in control board 105 section of FIG. 1 and can be described as follows:

Three interconnected control units are shown together in group 120 namely boxes 21, 37, and 38 for control of heat generation by lower level series of heating jackets as shown. The first box 21 as shown in the block of the same number and in detail in FIG. 8 receives sensing signals from two thermistors 20 where the two of which are shown together as a block 22 in FIG. 8, but now are particularized in one suitable control line as numeral 40 to show the extension of the one pair of thermistors to desired locations as in FIG. 16 and FIG. 1 where each thermistor is cross matched and balanced as necessary by compensators for use with an individual controller 16, where 40, an assembly of two such thermistors and their four circuit wires is placed in the lower compartment with meat between it and then heating coils in the lower section heating the air, as shown in FIG. 16 and FIG. 1 to sense the ending temperature of the air after it has passed the meat, when air moves upward in the oven; and 42 as placed in the lower compartment with the meat in that compartment between 42 and the heating coils in the upper level of heaters, heating the air when air is passed downward through the oven, to sense for ending temperature of the air after it has passed the meat in the lower compartment. One section of hand switch 46 determines the appropriate lead off of 40, to be switched to controller 21 as interlocked in same switch, as it switches in also the appropriate power lead 43 or 44 to fan motor 9 for the right direction of rotation of the fan motor to pull air upward or push it downward through the oven. The power lead 43 in FIG. 1 for fan 8 rotation to pull air upward, or power lead 44 to reverse fan rotation to push air downward, as the third lead 15 from fan motor 9 is to ground to complete the circuit. The second box 37 in control group 120 contains the program switch, shown in detail in FIG. 10 where the contact arm is moved back and forth by motor 23 in box 21 of the same group 120, to manipulate switching control current to leads 26, 27, 28, 29 and 30 as shown in FIG. 10 and also in FIG. 15 and 16 which extend in box 38 of same group 120, which contains power-in leads to circuits of heating coils 12a, 12b, 12c, 12d, and 12e also contains electromagnetic switches 124 in FIG. 15 and 16 actuated by control leads coming from box 37 to energize heating coils 12a, 12b, 12c, 12d, and 12e of respective circuits, and thus provide the controlled heat generation.

To describe the joint temperature sensing response control of the volume of airflow by varying the speed of the fan: Air temperature is sensed for a preset temperature level at its initial temperature after leaving the heating jackets and before striking the meat by sensing unit extension 39 of sensors in lower compartment which are associated with sensing control box 21 in group 122, where its motor 23 by pinion drive 131 FIG. 14 moves arm contactor 128 across linear resistance all contained in box 38a in group 122, and as shown in detail in FIG. 14 to lengthen or shorten resistance and vary speed of fan through lead 39 which passing to section of interlocked switch 46 to be alternately switched to lead 43 or 44 going to fan.

Using the lower cooking compartment as the space to be jointly heat controlled by both heat generation and airflow, when airflow is upward through oven group 120 of interconnected mechanisms boxes 21, 27 and 38 which are involved with the lower level heating elements, containing one coil of each of the five circuits 12a, 12b, 12c, 12d, and 12e of varying wattage capacities for coils 12a, 12b, 12c, 12d, and 12e respectively as shown in FIG. 15 and 16 in each one of the four separate heating jackets, and sensed for heat generation (variation) by sensing circuit 40; while simultaneously and conjunctively use of group 122 of interconnected mechanisms boxes 21 and 38a which are involved in regulating the speed of fan motor 9 and fan speed and rate of flow of air from fan 8, is sensed for fan speed regulation by sensing circuit 39 gives a total situation where sensing unit 39 is controlling for the initial temperature of air before it strikes the meat, and sensing unit 40 is controlling for the ending temperature of the air after it has passed the meat, and has had heat withdrawn therefrom by the meat. The method of compound temperature sensing response control of the above-described operation is as follows:

The initial temperature for the airflow before striking the meat is preset in variable resistors 17 of box 21 in group 122, and can be any temperature level desired for the resulting cooking effects, and the ending temperature of the air after it has passed the meat is preset with variable resistors 17 at box 21 of group 120, and can similarly be any temperature desired, though necessarily some little or considerable lower than the temperature level preset for the initial temperature, to provide for withdrawal of heat from the air stream by the meat, for cooking results also, such as crusting, overcooking and undercooking, etc. In this method of heat control, varying the air volume or relating mass of air to heating elements delivering heat thereto becomes, in reality, a temperature control of the air stream, while varying the amount of heat being generated becomes in reality the heat volume control. Thus, with a system of out-going heat delivery, with no heat storage in metal possible, this compound temperature sensing response operation controls the volume of heat on an absolute basis at these temperature levels which is delivered to and absorbed by the meat or other cooking goods.

The amount of heat volume which can be absorbed by any given mass of meat would, of course, vary upward or downward with the temperature levels at which the heat is delivered to the meat. With any given preset temperature levels for initial and ending temperature of the air volume, the meat will continue to cook with the controls both air volume and heat generation varying under the temperature-sensing response system to produce the volume of heat being absorbed by the meat at these temperature levels so long as the meat is able to absorb enough heat from the gradually decreasing volume of both air volume and and heat generation to effect the drop in temperature levels between these two beginning and ending temperature points. When heat generation and airflow both can be observed to have dropped drastically, the controllers and power feed through the electromagnetic switches to motor 23 controlling the fan speed can be cut off, whereupon the fan speed and air volume will remain fixed at this point thereafter, and the meat-cooking process can continue until the initial temperature drops gradually to approach the same temperature level as that for the ending temperature until meat is done.

Safe cooking at lower heat is possible when the ending temperature at point 40 is down to the lowest temperature and heat level which will still prevent the multiplication of bacteria cultures involved in the spoilage of meat, as this is the lowest temperature level in the oven.

The compound temperature sensing operation can be maintained in either the lower cooking compartment with airflow in either direction, or in the upper compartment with airflow in either direction, but not in both simultaneously, by manipulation or switching of switch 46 sensing units and direction of fan rotation as follows:

Group 120 involved with the lower level of heating coils, and with sensor circuits 40 associated therewith, is operable for cooking in the lower compartment with sensing unit 40 operating therein when airflow is upward in the oven, and is operable for cooking in the upper compartment with sensing unit 40 operating therein when airflow is downward in oven. Group 121, which is an exact duplication of the mechanisms, interconnected, of that for 120 with sensing units 42 associated therewith, is operable for cooking in the upper compartment with the sensor circuit 42 operating therein, when airflow is upward in the oven, and is operable for cooking in the lower compartment with sensor unit 42 operating therein when airflow is downward in the oven.

Group 122 with interconnected mechanisms in boxes 21 and 31a in FIG. 1, with sensor circuits 39 (and 41 associated therewith) will control the volume of airflow in accordance with the temperature-setting preset therefor, and as sensed at any one of the two sensing units 39 or as sensed at any one of the two sensing units 41. 39 is designated for use when airflow is to be upward, and 41 is similarly designated for use when airflow is to be downward.

The direction of flow of heat upward can be reversed to downward flow with sensors interchanged for proper cooking operation by manipulations as follows: As airflow can be sensed at one point only, all eight thermistor sensing units associated with box 21 in group 122 lead in to hand switch 45, and as separate units, namely 39 and 41 as placed in the upper cooking compartment, and 39 and 41 as placed in the lower cooking compartment. Use of two position switches 45, interlocked will switch in 39 and 41 respectively of upper cooking compartment when thrown to one position, will switch in 39 and 41 respectively of the lower compartment when thrown to the other switch position, to select whichever one of the two cooking compartments is to be used for joint control for heat generation, and extends such circuit connections to hand switch 46, interlocked not only for the airflow sensor units but for upper and lower level heating coils, and circuitry for controlling the direction of fan rotation, and airflow, also in a two position switch 45 which when thrown to one position interchanges all sensor connections and fan motor rotation circuit in such a manner that only one sensing unit of airflow as proper for joint sensing operation for that airflow is switched in for the control cooking compartment as previously selected by switch 45 and proper sensing unit for heating coils upper or lower for proper airflow (upward or downward) for both cooking compartments, and thermistors in the fan motor lead also for proper fan rotation and airflow, all by upward flow for one switch position of 46 and downward airflow for the other switch position of 46.

With joint sensing operation for airflow and heat generation switched to either one of the two cooking compartments, it cannot, of course, operate for the other one of the two compartments. On the other hand, airflow as it is control jointly with heat generation in one compartment is fixed for its flow through the other compartment. Heating coils operating for the other compartment with proper sensing unit at proper sensing point can react to the fixed airflow and volume, and control for the ending temperature as preset after passage around meat in this other compartment. And while not participating directly in the compound sensing operation, it can cooperate in a sensing operation where this other cooking compartment is merely, as it is designed to be, an annex of the other compartment containing meat which compares in bulk or mass and content condition with meat in the controlling compartment, when the heat absorption capability of the meat in the noncontrolling compartment will be approximately the same as that for the controlling compartment, and the beginning or initial temperature level for the air before striking the meat in noncontrolling compartment, will be approximately the same as for the controlling compartment, but, however, the meat mass is larger in the noncontrolling compartment, more heat will be required to maintain common ending temperature, hence the initial temperature in that noncontrolling compartment will be higher than that for controlling compartment, or if meat mass is less and heat absorption is less for noncontrolling compartment, then the initial temperature of the airflow in this compartment will consequently be less than initial temperature of airflow in controlling compartment.

Figures 1A, 2, 4, 5:
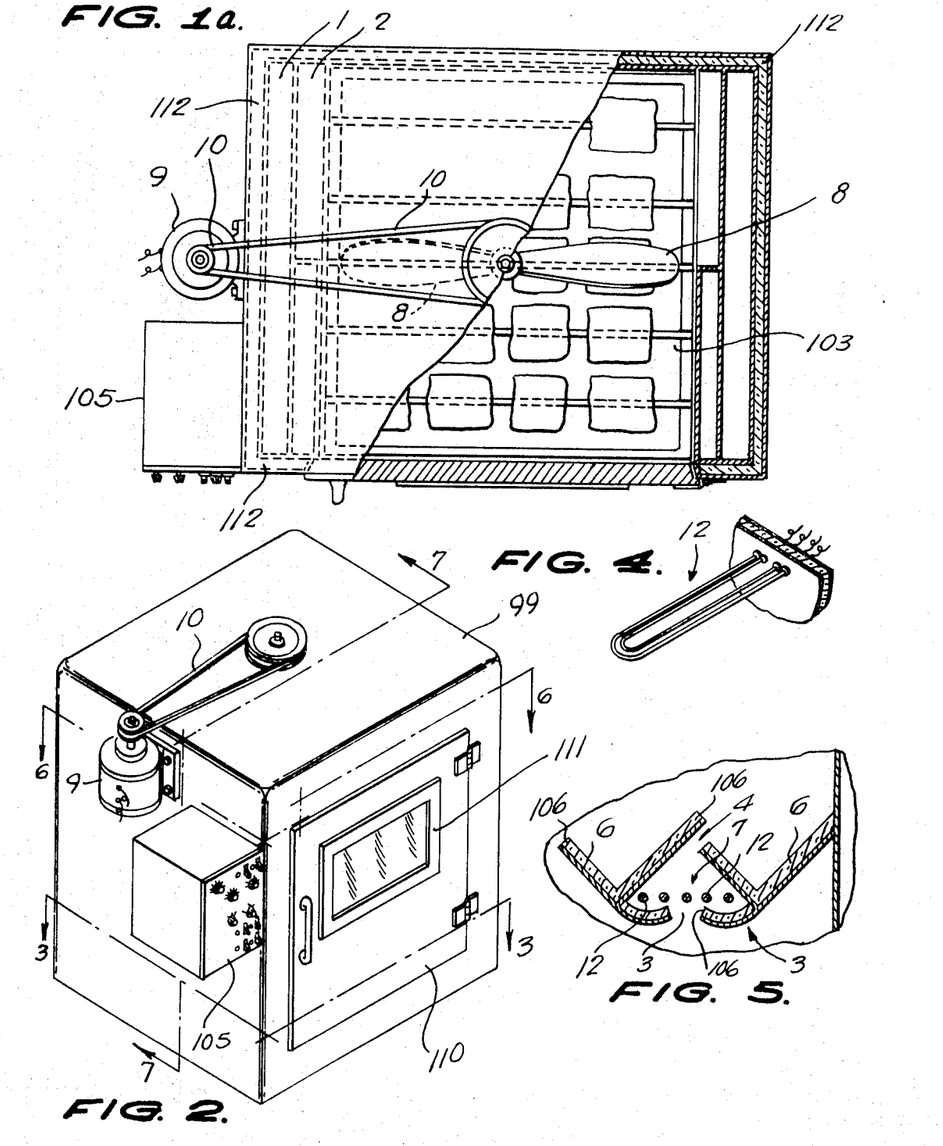
FIG. 1a shows a top plan view of the oven assembly.
FIG. 2 shows the external perspective view of the oven casing of the oven in which fixed controls are located, with the control panel and fan motor attached thereto.
FIG. 4 shows a pair of heating elements on a mounting base and their connecting wires.
FIG. 5 is a view taken on line 5—5 of FIG. 3 and shows the structure of heating jackets with heating elements mounted inside, and a thermistor temperature sensing element mounted nearby.

Referring now to the drawings showing fabrication and structural aspects of the oven:

FIG. 2 shows at 99 the exterior metal casing of the boxed-in oven having a door 110 opening out from one side thereof, and containing a glass window 111 and having mounted at one side a control board 105 containing control components as shown in detail in FIG. 1.

Figure 7:
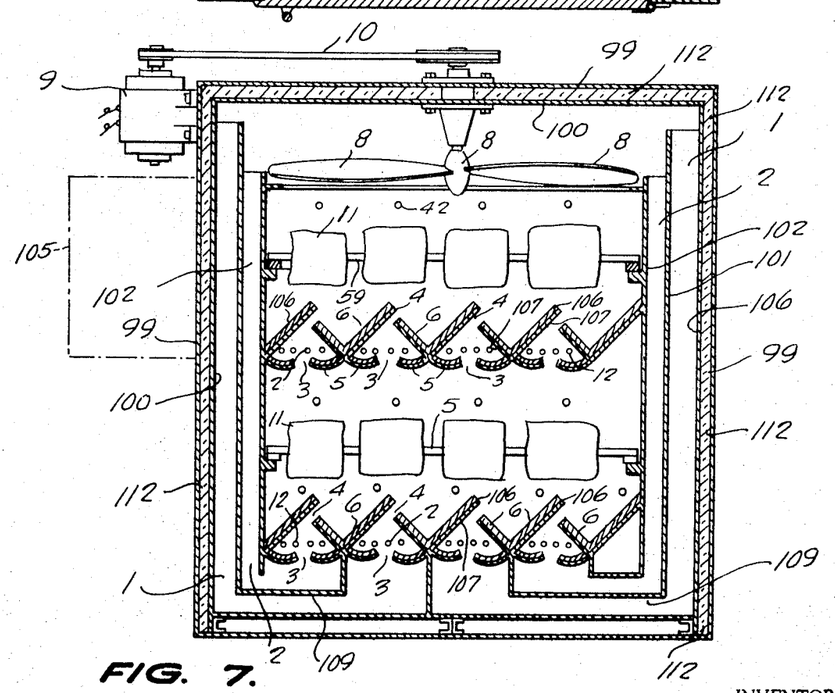
FIG. 7 shows a view taken on line 7—7 of FIG. 2, and shows a cross-sectional view of the oven casing including a plurality of shafts on which roasts are mounted, and a plurality of heating elements mounted in shielding jackets, and air conduits through which currents of air are directed by the fan.

As shown in FIG. 7, flexible heat insulating material 112 is laminated between outside metal casing 99 and inner metal surface 100. Partitions 101 and 102 are spaced apart from the inner sidewall at either side, and extend horizontally from front to back, with top edges spaced apart from inner metal surface of top of the oven to provide air passageways, and similarly having lower edges spaced apart from inner metal of bottom of oven to provide air passageways, except that one edge of partition 101 extends sufficiently below the edge of partition 102 to make a right angle juncture with separator plate 109, where 109 extends and bounds air channels 1 and 2 formed between spaced apart partitions to respective ones of the bottom row of heating jackets. Partitions 101 and 102 are detachably positioned from inner back of oven.

A series of baffle plate drain troughs and heating jackets 5 and 6, each running or projecting from back to front are arranged in a row along a horizontal level, and spaced apart so that a heating jacket enclosure 7 is partially enclosed by each two.

Figure 9:
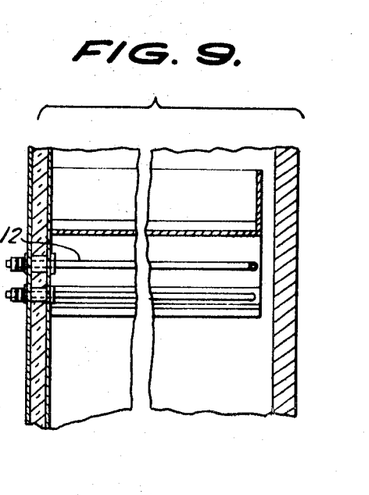
FIG. 9 shows a side view of details of the mounting of one heating element.
Figure 12:
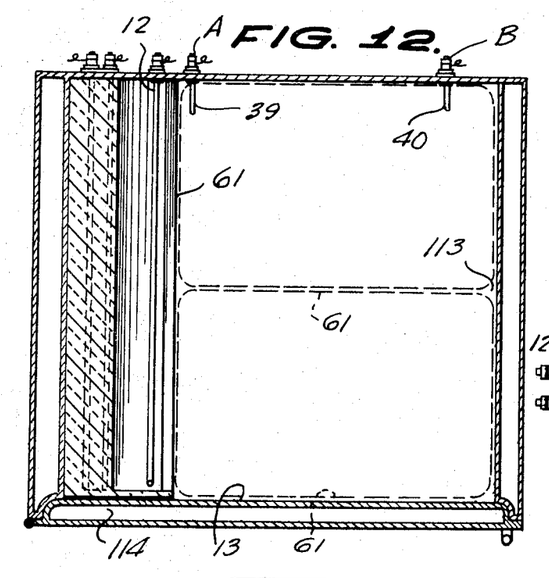
FIG. 12 shows a view taken on line 12—12 of FIG. 11 and shows a plan view of the metal baffle and heating jacket adjacent thereto.

The two inner partitions, 102 each running from front to back, at each side of cooking compartment, make each a right angle junction with fan plate 103 as shown in FIG. 13. Fan plate 103 has a cutout for fan travel and separates the cooking compartment from the air head above the fan, and functionally prevents any back flow of air contained in this air head back down into the cooking space, adjacent baffle plates and with air passageways openings one at top 4 and one at bottom 3 of heating jacket so formed, with each unit of baffle plates so constructed as shown in front view in FIG. 5, where top wing trough 6 may catch and contain or drain grease and liquid drippings where the right side of wing extends up over and overlaps the opposite of the wing of adjacent trough, and is a metal casing having an inverted downward winglike heel 5 extend outward in either direction to act as a shade for heating elements enclosed in 7. Interposed between outer metal trough 6 above and 5 below and inner metal surface 107 of the heating jacket is a layer of heat-insulating material 106 to prevent the transfer of heat from heating elements either by through-metal conduction or radiation. Each baffle plate unit extends on cantilever from back where it is detachably positioned in the oven back. The bottom row of baffle plates opens directly into individual air channels 1 or 2 through aperture 3, and open upward into oven, where another row of baffle plates are superimposed from the back of oven along a horizontal level higher in the oven. Each heating element assembly in heating jacket 7 contains one or more electric heating coils 12 each coil with individual terminals for circuit connections mounted in suitable ceramic and metal sheathing, is mounted in a threaded manner with screwdown bolts in back plates of oven and extends frontward through enclosure 7 makes a hair-pin bend and back to mounting as shown in FIGS. 4, 9, and 12.

Fan 8 is rotatably mounted in the center top of the oven in a manner to pull air upward, or downward through oven to or from air channel 1, 2 spillways, and traverse the traverse circular span of the oven in which the cooking area is of equal width and depth. Fan plate 103 as shown in FIG. 13 extending front to back along one horizontal level and making right angle juncture with inner partitions 102, has a cutout to circumscribe and bound fan blade travel space and thus separate upper fan head space opening into air channels 1 and 2 and the main oven space.

Figure 3:
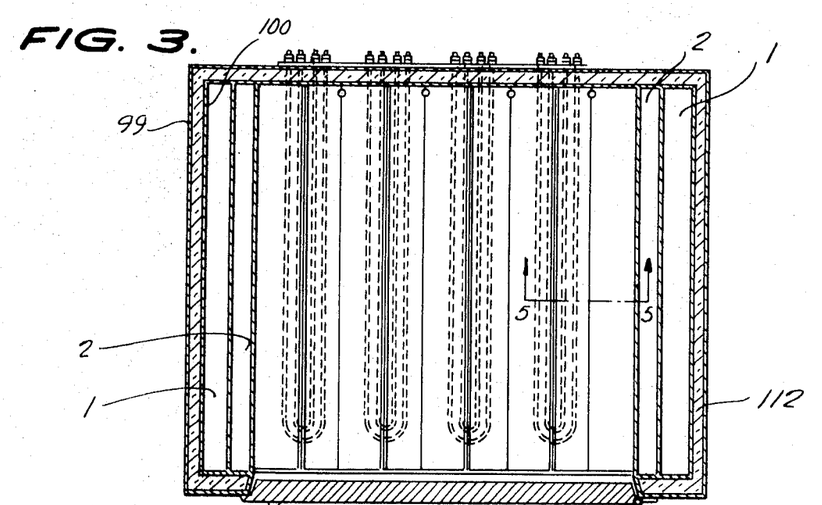
FIG. 3 is a vertical view through the oven casing taken on the line 3—3 of FIG. 2, showing heating elements mounted in positioned groups.

FIG. 3 is a vertical view of top side of the troughs and heating jackets with positioned heating elements extending thereunder as taken on line 3—3 of FIG. 2 and shows the four troughs overshading the four respective heating jackets located on one horizontal level.

Figure 6:
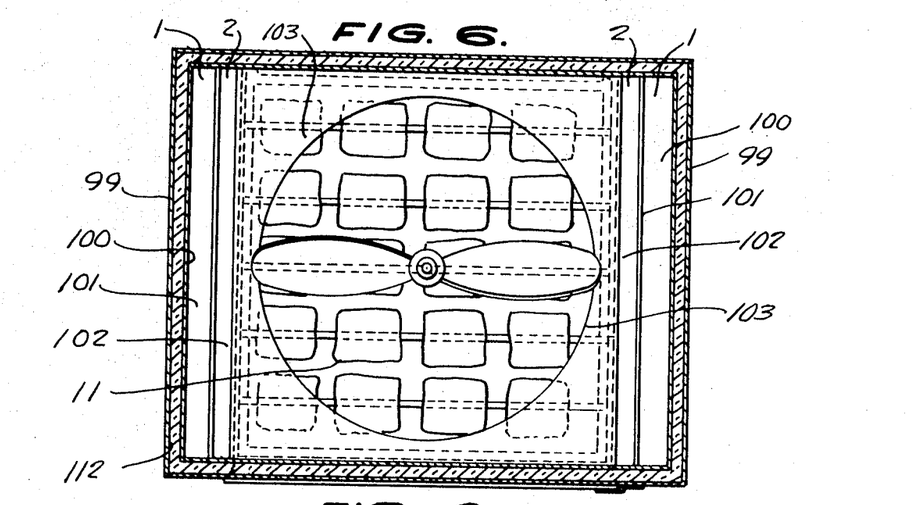
FIG. 6 is a view taken on line 6—6 of FIG. 2, showing a plurality of roasts mounted on a plurality of shafts disposed transversely of the oven casing, and a fan to direct currents of air thereon.

FIGS. 6 and 6a show top plan view taken vertically of the inner oven space with fan motor 9 and control board 105 attached to the outside, and shows meat 11 as mounted on rods 59. These views are also taken on line 6—6 of FIG. 2. Meat may also be positioned in cooking space on insertable racks 60 as shown in FIG. 1.

FIGS. 4 and 9 show the mounting of electric heating coils. Details covering two such heating elements show the manner of mounting plural elements even though the number of such elements may be as many as 5 or more. Moreover, actual heating coils may in plural numbers be mounted within one metal sheath, viz: the three lower rated coils X, 2X, and 4X may be enclosed in one metal sheath, while coils of rating 8X and 16X may be enclosed in the second metal sheath.

A modification may be made of this oven and heat control system using the intervalized positions for heat generation, or heating jackets, in the manner described to heat-treat cooking, or for the heat treatment of goods with horizontal charges of heated air, controlled in the same manner as for vertical travel of air. Such a modification consisting of metal baffle adapters running from front to back in cooking or heating space and across, sideways to make a junction with a heating jacket in which plural heating elements, controlled in same manner as shown in FIG. 1, may be effected in the same oven enclosure as shown in FIGS. 1 and 7 by provisions for mounting baffle heating jackets and heating coils.

Figure 11:
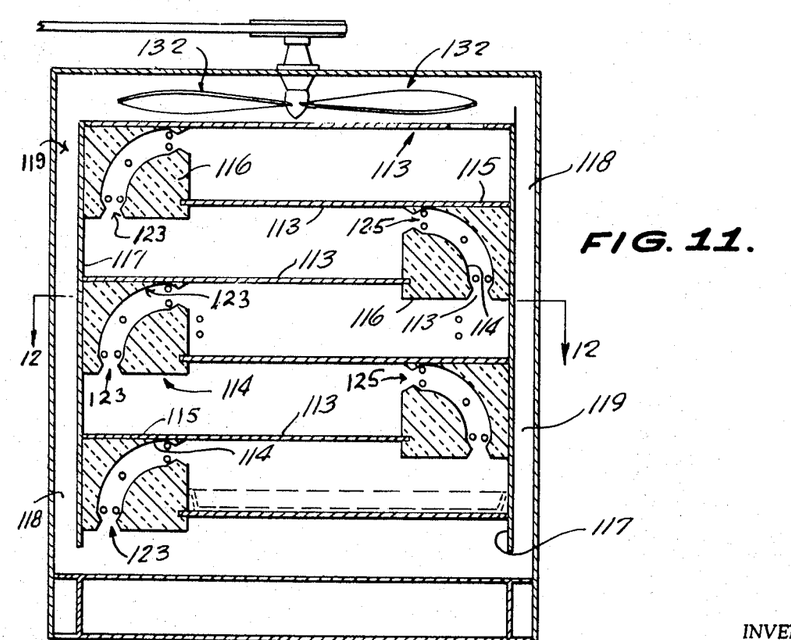
FIG. 11 shows details of vertical section showing baffle metal adapters to direct air horizontally from one heating jacket to the next, and arranged as shelves on which to place roasts or cuts of meat, in containers containing liquids, or pans of baking materials.

The essentials of such a heating system employing side to side delivery of heated air are shown separately in FIG. 11. Two partitions 117 separate cooking space from oven inner metal 118 and form two air channels 119 running from front to back, and running vertically to form the two sides of the cooking space. Metal baffles, adapters 113, run front to back horizontally and likewise across each respective level, taken to make a T or right angle junction, with insulated heating jacket 116.

Heating jacket 116 consists of two spaced apart insulated sides, running horizontally from front to back of the oven enclosure. The corner side 115 with insulating material between inner metal surface 116 and the other metal surface which makes a corner junction with the side of partition 117, and the next succeeding upward metal baffle 113, while the inner section of the insulated side of heating jacket 114 with its inner metal surface 116 spaced apart from that of the side 115 to form heating jacket 116 in which heating elements 125 are positioned from back to front of the oven, and through which such formed heating jacket moving air is passed around said heating elements 12, from one level formed by metal baffle 113 and the next lower, or higher such metal baffle 113 below or above it, where the air pulls around between two adjacent metal baffles 113 and their respective adjoining heating jackets 116 positioned at alternate sides of the cooking space from one cooking level to another as pulled upwardly or pushed downwardly by fan 132 to make one circulatory cycle after another and as regulated by temperature-responsive fan motor speed control by same system as shown for boxes 21 and 38a in FIG. 1, group 122, where heat generation is varied up and down with plural circuits of plural heating elements 12 located one element 12 of each circuit in each heating jacket, by same combination of boxes 21, 37, 38 in groups 120 and 121. Motor means is provided to drive fan 132.

The control mechanics of cooking or heat treating with these particular controls are as follows: An array of uniform heating elements as shown in FIG. 16, are positioned to protude from back to front in each heating jacket shown in FIG. 11, where each jacket is formed by the inner metal surface 116 of insulated bolster 114 joining in the end of metal baffle 113, and the inner surface 116 of adjacent insulated bolster 115 jammed as molding against the side or partition 117 and the next upward succeeding metal baffle 113, as the heating jacket so formed making a 90° circle bend from lower vertical opening or aperture 123, to exhaust, when air 117 upward flow, in a horizontal direction through upper opening or aperture 124, where each such heating jacket runs front to back of the oven structure making a right angle junction with back of the oven. These heating elements of schematized wattage rating variance as shown in FIGS. 15 and 16, with variable heat generation effected by respective electromagnetic power switches 124, as manipulated by the program switch as shown in FIG. 10, in response to two temperature point sensing as developed in FIG. 8, with sensing heads A and B as shown in both FIG. 11 and also in FIG. 12.

FIG. 12 is a top view of the metal baffle 113 and adjacent heating jacket 116 taken on the line 12—12 of FIG. 11. When air is passing in the updraft direction through the oven structure, air is leaving the lower cooking level to be heated according to sensing controls, one set for regulating the flow of air, (fan speed) as located at A in both FIGS. 11 & 12, for initial or maximum temperature, and the other sensor located at B, set to control the regulation of heat generation at the ending, or minimum temperature, as the heated air passes across the top of the meat, baking goods or other heat treatment goods such as metal or textile strips to proceed upward through the next aperture 123 and heating jacket and out horizontally in the opposite direction in the cooking level above. In the case of meat or baking goods held in pans as positioned on metal baffle 112, they receive heat by through metal conduction from said metal baffle 113 which is in heat exchange relation with air passing through the cooking level just below, as has been similarly heated in next previous heating jacket 116. Dotted lines 61 in FIG. 12 outline the space occupied by baker pans. If air is down draft, then B becomes the control point for airflow, and A the point for control of heat generation. All heating coils in each respective circuit are of the same wattage rating and located one element in each heating jacket, and as connected parallel can be controlled by one respective electromagnetic switch 124, for each of five currents.

This oven control system, including its provision for even heat generation and dispersal, and the compound sensing system, controlling both the volume of heat generated, and the volume of airflow to which the heat is transferred as a heat changing medium, may be utilized to provide even heat delivery, and to insure against both overheating and underheating in post-curing or deferred curing of textile garments or piece goods containing synthetics and impregnated cross-linking additives such as resin, sulfone chemicals or other finish additives, wherein said textile goods, properly positioned in the heating space, instead of meat, or other food goods, as hereto described are exposed to heat treatment.

An embodiment of the essentials for such operation, and including special structural arrangements intended to overcome some of the shortcomings presently experienced in conventional ovens, are as follows: Plural units 199 in FIG. 17 each of which is an entity, as shown in FIG. 2, are placed contiguously in series with one another, front to back, and with each backwall 99, as shown in FIG. 6, and with each door 110, as shown in FIG. 2, as intervening between any two of the units 199 removed, so that one unit 199 opens directly into the next unit 199, and where the completed configuration, as shown within the solid lines in FIG. 17, consists of plural cells or cubical spaces 199, as indicated by dotted lines as subdivided cubical spaces, where each such cell or cubical space contains a complete heat generation and control assembly as illustrated in FIG. 1 and FIG. 6; or where, as an alternative, each cell or cubical space may contain a heat generation and control assembly as shown in FIG. 11 and FIG. 12, but where either one of these heat generation and control assemblies is operationally augmented with control devices as illustrated in FIG. 8, FIG. 10, FIG. 14, and FIG. 16, so that the system will operate individually within each said cell.

Such an assembly of individually operating units 199 may have textile goods batch loaded therein for exposure of textile goods to heat treatment at a uniform temperature level in all cells, but where, however, the temperature level may be progressively raised and then lowered during predetermined stages of the curing process.

Figures 20, 21:
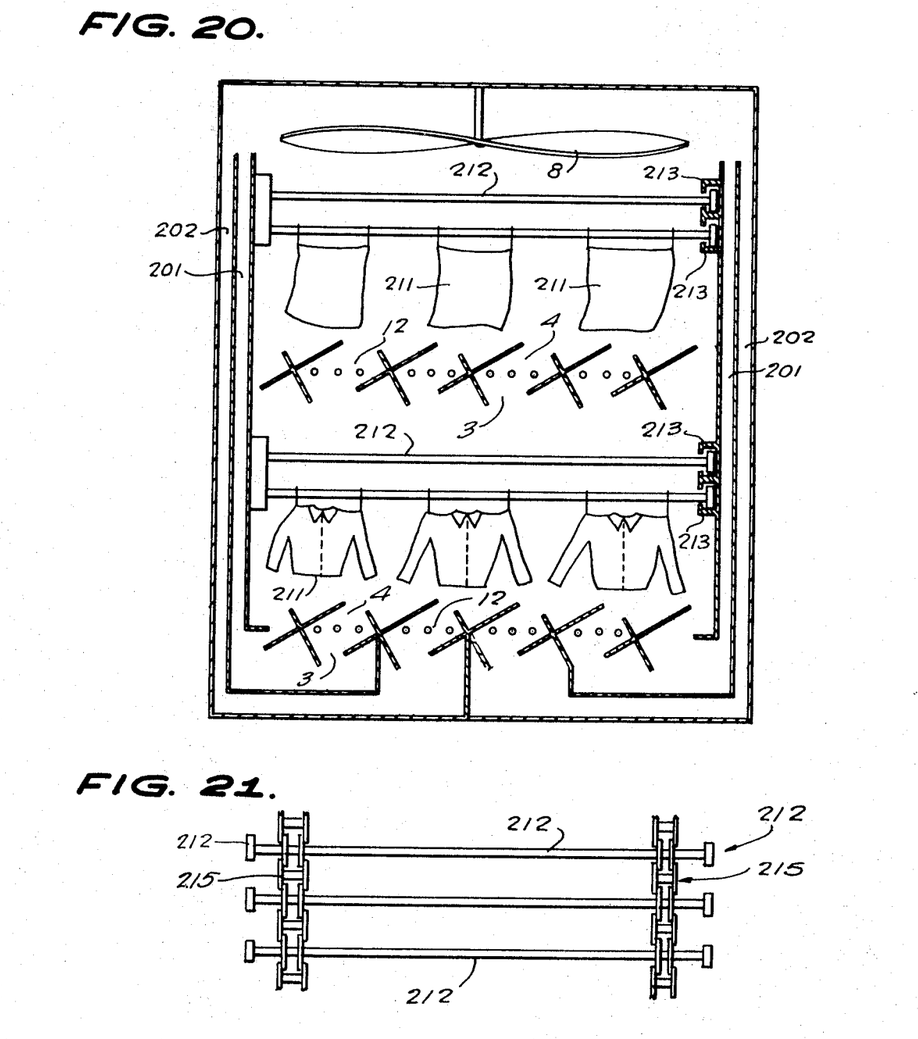
FIG. 20 is a view in cross section of one cell of FIG. 17.
FIG. 21 is a top view of one of the cells of FIG. 17 showing the section of the conveying means for the objects to be heated.

An alternate method may be employed to accommodate the progressive movement of textile goods, properly prepositioned, successively to and through each respective cell by means of a moving conveyor system 212 as shown in FIG. 20, where each respective succeeding cell, or cubical space may employ a progressively higher or lower temperature level for heat treatment, viz: 199a, at temperature $t$ plus $y$; 199b, at $t$ plus $2y$; 199c, at $t$ plus $3y$; and 199, at $t$, whereto represents the ambient room temperature and $y$ represents a fixed temperature value as expressed in a given number of degrees Fahrenheit, i.e.,: 50° F; 75° F., 25° F.; 40° F. etc., 100° F. etc.

This progressive application of heat intensity to textile goods, amounting to a tempering process, results in a more gentle or softer application of heat treatment to effect a bonding of cellulose molecules by resin or sulfone or other chemicals into a permanent shape at lower maximum temperature peakes than those usually used at present, the lowest of which appears to be 320° F. for 8 minutes exposure. This lowered temperature peak results in a lowered requirement, percentagewise of synthetic fibers in the fabric blend, as imposed especially to reinforce for the resulting damage to cotton fibers from higher heat; and higher heat peaks results, additionally in a requirement for a less amount of resin, sulfone, or other chemicals, imposed especially to bond the cellulose fibers of both cotton and other synthetic fibers. A 50 percent reduction in tensile strength damage to cotton fibers from heat is commonly accepted under present curing procedures. This tempering method should permit complete curing or bonding at a peak temperature as low as 250° F., and perhaps down to as low 225° F. The lower damage to cotton fibers will improve the shape memory of the garment, as well as the wearing quality of the finished product, and should result in a lower amount of shrinkage than now accepted under present methods of curing.

In operation, if heat treatment using the progressive change in temperature levels, cell by cell, where basic materials cellulose and resin or other chemical ingredients, results in an energy exchange as the molecular bonding occurs under heat treatment to an extent that some heat input is still required in each cell 199, where its temperature level is lower than that of the next preceding cell, for this bonding to occur, there is no problem in using normal heat and air controls in the cell with a lowered temperature level. However, the use of the tempering process, and is resulting lowered peak temperature level the goods have undergone, is intended to lower the amount of energy exchange involved in the bonding process, and thus to lower the degree of deterioration or disintergration of both fabric and dyes.

Thus, achieving the desired end of minimizing the energy exchange, the heat treatment tends, more and more, toward a heat exchange between the textile goods and the heated air swathing them, whereby the textile goods thereby serves more and more as a heat sink for the temporary storage of heat. It may become necessary, therefore, to simultaneously partially or fully exhaust heated air at the top of the cell, and to partially or fully intake the cooler air at room temperature. Thus, such a partial or full exhaust of heated air is made through exhaust port 200 in FIG. 17, while at the same time, partial to full intake of cooler air is made through an intake port similar to that for the exhaust which may be located at the bottom of the cell (not shown) or through smaller intake ports distributed at intervals within the cell, thus, to disperse the cooler air properly to all textile goods involved in the cooling-down process. This valve control operation for such parts is temperature responsively actuated by movements of the contact arm as illustrated in FIG. 14, or as illustrated in FIG. 10 and as the fan speed is also simultaneously controlled therewith.

Figures 17, 18, 19:
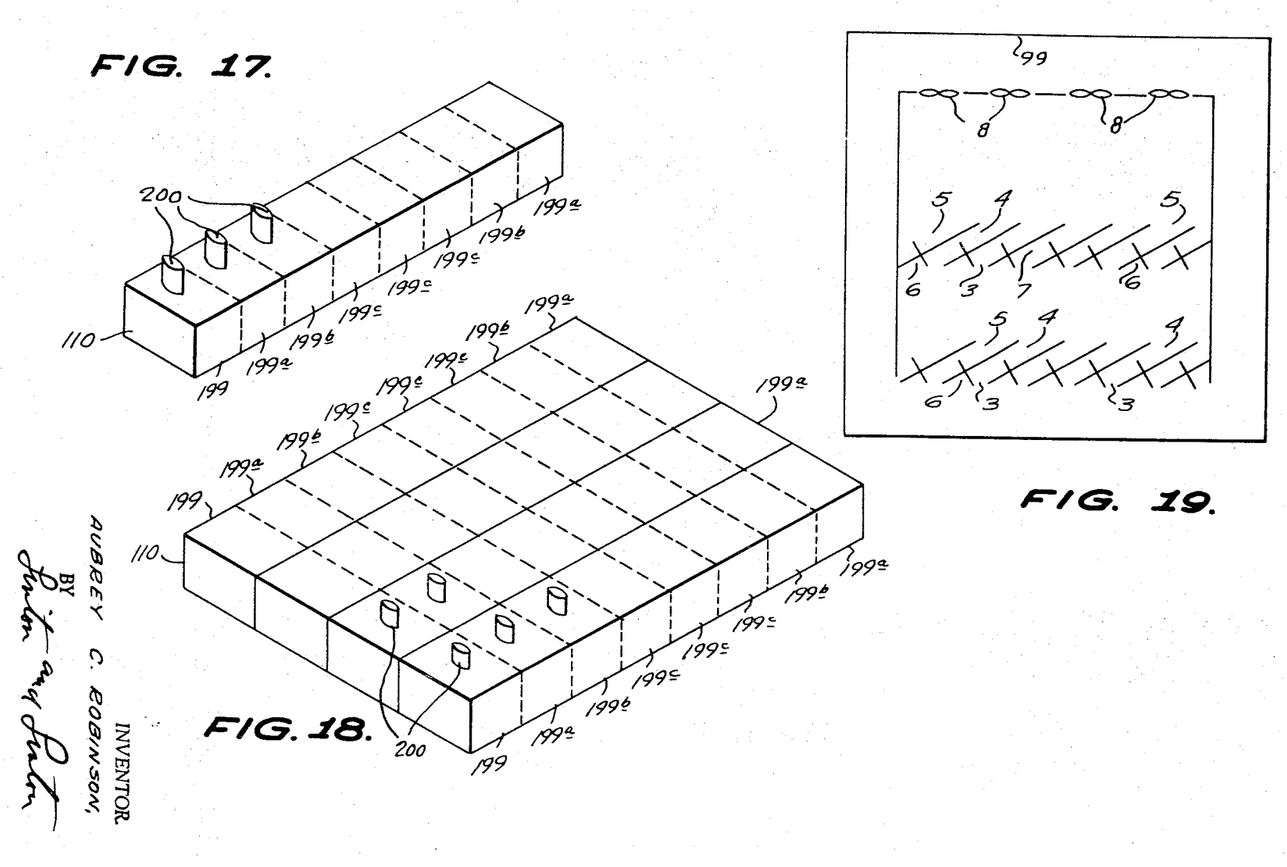
FIG. 17 is a perspective view of heating units assembled together in series.
FIG. 18 is a perspective view on an array of plural assemblies of the units of FIG. 17 arranged longitudinally and transversely in rows.
FIG. 19 is a view in cross section showing the interior space arrangement providing the air return channels on the edges.
Figure 22:
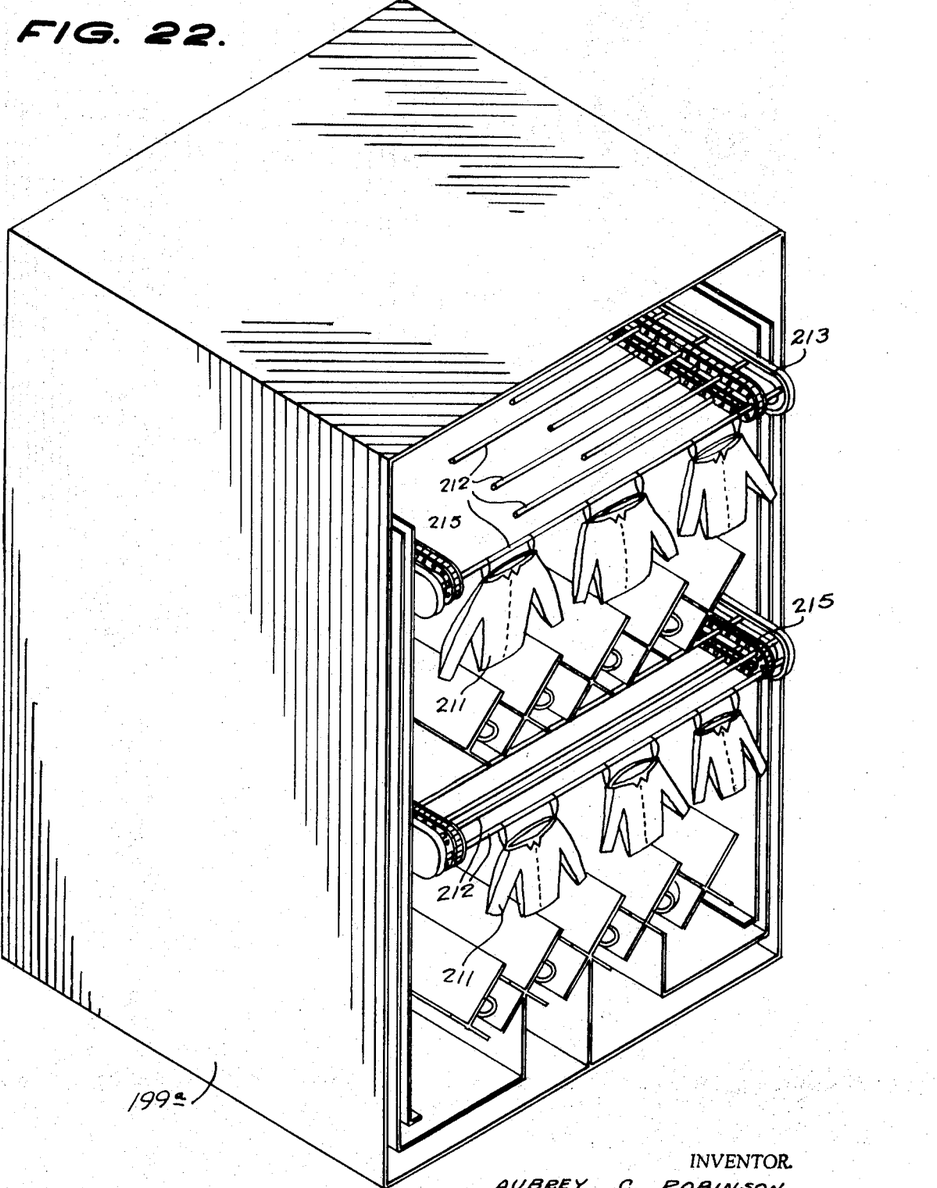
FIG. 22 is a top view of one of the cells of FIG. 17 showing the conveyor system.

Plural units 199, or cells, may be contiguously arranged side-by-side, by side, as well as front to back in rows as illustrated in FIG. 18, where solid lines outline the completed configuration, and dotted lines indicate subdivided spaces therein, and as shown cross-sectionally in FIG. 20 and in perspective detail in FIG. 22. Such an arrangement of cells, with each section of subdivided spaces side-by-side having its own individual heat generation and control system, a front view of which is shown in FIG. 19, and as it may be imposed within existing oven shells already in place in using establishments to effect the necessary conversion for heat treatment of textile goods in accordance with the conditions outlined, and procedures prescribed, in the foregoing.

In the operation of the compound sensing control of both heat generation and airflow in the step-by-step heat treatment of textile goods, particularly in using the tempering method, it would be well to set the temperature level for the ending temperature (minimum) 10° F. below that set for the initial (maximum) temperature needed in each cell. The tempering process as applied to present blends and additives presently used in deferred curing of stretch denim, would be as follows:

Use seven cells 199 as described above, where the movement of goods 211, as suspended on hangers from the cross bar of the moving conveyor 212 as shown in FIG. 20, through each cell 199, will require the same amount of time; use 95° F. as the value of $y$, and, starting with the ambient room temperature of 75° F., the stepped-up temperature in the first cell 199a where the textile goods 211 are first exposed to heat treatment, will therefore be at 170° F.; the next cell 199b will, therefore, be 265° F.; and the next three cells 199c will have a constant temperature of 360° F.; and the next cell 199b will have a dropped-down temperature of 265° F.; and the next, 199a down to 170° F.; and the final cell, 199, at room temperature of 75° F. Travel time is fixed at 2 minutes through each cell. Here textile goods have an overall heat-treatment exposure at 170° F., or above, of 14 minutes; and 10 minutes at 265° F. or above, and at peak temperature of 360° F. for a total of 6 minutes.

An alternate procedure which should result in less deterioration for some other types of textile goods using a different blend, with less synthetics and resins of bonding chemicals, can be as follows:

Use 75° F. as the value of $y$, where the first cell, 199a will be at 150° F.; and the next cell 199b will be at 225° F.; and the next three cells, 199c will have a constant temperature of 300° F.; and the following cell 199b will have a dropped down temperature of 225° F.; and the next cell down to 150° F., and the final cell at room temperature of 75° F. Travel time is fixed at 2 minutes through each cell. Here textile goods will have an overall heat treatment exposure of 14 minutes at 150° F. or above; and 10 minutes at 225° F. or above, and at a peak temperature of 300° F. for 6 minutes.

As initiative in revision of blend formulas follows full confidence in and acceptance of the fact that there will be no underheating and/or overheating in the tempering method below or above the range from initial and ending temperature of air passing around the textile goods to transfer heat thereto, blending mixtures and bonding additives should be lowered to make full use of the tempering heat exposure in seeking longer wearing life and better shape memory of textile garments, and a suitable procedure doubtless will be as follows:

Using 58° F. as the value of $y$, and starting with an ambient room temperature of 75° F., the first stepped-up temperature in cell 199a will be at 133° F.; and the next cell 199b will be at 191° F.; and the next three cells 199c will have a constant temperature of 249°, or 250° F.; and the first dropped down temperature in cell 199b will be again at 191° F.; and the next cell 199a down to 133° F.; and the final cool-off cell 199 at room temperature of 75° F. Travel time is 3 minutes in each cell. Overall heat treatment at 133° F. or above 21 minutes at 191° 12 minutes and at peak temperature of 250° F., 9 minutes.

A satisfactory conveyor system may be as partly shown in FIGS. 20 and 21, where the conveyor consists of a plurality of cross bars 212 which extend laterally across the heating space, and which are linked together with the sprocket link chain 214 at each side, and where the sprocket link chain also passes over two driving sprockets actuated by aiding driving motor-impelling movement of the conveyor rods or bars through the cells, also not shown. Each cross bar has a freely turning roller at either end, and fashioned to be partly encased in supporting rack 213 as affixed on the sidewall of each side of the heating space in successive heating cells. The bars pulled by link chain 214 with racks of textile goods 211 suspended therefrom as shown in FIG. 20 pass into and move through each cell, a front cross-sectional view of which is shown in FIG. 20 where textile goods 211 move backward through successive cells as the bar (one of the plural bars) moves along the lower rack rail 212 on each side of the heating space to support textile goods 211 in prefixed position, as heated air passing around heaters 12 receives heat at the fixed temperature levels and airflow speed necessary to maintain these temperature levels and impart heat to moving textile goods 211 at these prefixed temperature levels. Conveyor bars 212 with textile goods removed therefrom return in lapped-over manner in rails 213 in FIG. 21, as shown in FIG. 22 to complete the convey cycle over again.

In any one of the three procedures outlined above, the result is a lower heat exchange impact by the textile goods initially, where each step, in the step-by-step procedure in the heat intensity buildup serves as a preheating state for the next succeeding cell, and as a precooling stage in the cooling-down cells; and this results in a requirement for a lowered rate of air flow in all cells, and in a more constant heat absorption rate, in BTU's per minute by the textile goods during the entire curing process.

More specifically, in the step-by-step buildup of heat intensity, cell by cell, the textile goods are preconditioned, heat absorptionwise, in each cell for the receipt of additional heat intensity to be imposed in the next coming cell, in cell by cell stages, from ambient temperature on up toward the lowest heat intensity necessary to induce the bonding process of the fibers in the fabric of the garments. And, here, heat intensity is determined by both the temperature level and the depth of the intensity as measured by the volume or flow of air involved in heat delivery. After undergoing heat treatment at constant heat intensity for the minimum time interval required for bonding, as the garments proceed through the step by step cooling down stages, the brief interval of time in each stage permits some seasoning of the bonded fibers at progressively lower temperature, stage by stage, than that having been reached for bonding, on down to room temperature.

In such a process, this oven system can insure correct adherence to prescribed procedures by textile goods in quantity; the provision for even heat generation and dispersal by and through evenly dispersed flow of air for delivery to goods of primary heat permits no shading or starved or depleted heat depth delivery to goods to result in underheating, except as provided for in differential sensing and permits no uncontrolled delivery of wild heat from uncontrolled sources to result in overheating; and the compound sensing for control of both volume of heat generation and the flow or volume of air medium to which the heat is related, senses and proportions the exact amount of heat intensity required in each cell, with the heat control in each cell completely independent from that in any one of the other cells. This provides flexibility for adding to the number of cells from the number of cells outlined above to fix breaks in the heat intensity levels at lower values of y, for formulating processing heat level and time interval-wise as necessary, for various purposes or results, and for various blend mixes, as it provides strict adherence to the predetermined formula for which the controls are preset.

If a 10° F. differential between the initial, or maximum, temperature level, and the ending, or minimum temperature level, is used, it is intended that the initial or maximum temperature level be set at 5° F. above the temperature level stated for each cell, and the minimum or ending temperature level be set at 5° F. below this stated level.

FIG. 21 is an expanded cross-sectional view of one cell 199 as shown in FIG. 17, with fan 8 positioned therein as well as air return channels 201 and 202 going to respective heating jackets 7, with garments 211 positioned to suspend on hangers from conveyor rods 212, each rod with the roller at each edge held in supporting rail 213 along each sidewall of each heating cell, where these cross rods are linked together with sprocket chain 214 (or 215), as shown in the vertical or top view of section of conveyor in FIG. 20, as is shown operable in perspective view of the interior of each cell 199 as shown in FIG. 22.

FIG. 19 shows a consolidated space arrangement for an arrangement of four cells abutting transversely as shown in FIG. 18, with the side walls removed and space for air channels at each edge of the resulting structure, and with four axial type fans operating contiguously through fan plate 103.

The cell arrangement stage by stage, increases in heat, pickup again on even heat dispersed and instant response cell by cell arrangement providing two valuable flexibilities.
1. In changing value of y for internal purpose results.
2. Together with compound sensing designed heat volume for the required heat volume for goods as they are in each cell, each instant clearance designed again to change with garment weight and size as soon as changed garments reach sensing space.

As to the physical resin bend slight period at each receding heat levels allows a brief seasoning period in each cell for newly formed physical blend bend.

Heat treatment may be rendered by a tempering method to metals, ceramics, wood, lacquers etc., either in fabricated objects or piece materials in a method to prevent unintentional or accidental underheating or overheating by use of an individual compound sensing and heat control system in each of several subdivisions of a heat treatment ovenlike over structure, wherein each such subdivision is positioned in a series arrangement with other such subdivisions in such a manner that procedurally predetermined stages of heat treatment may be effected in an ascension of heat intensities, an individual intensity for each such subdivided space, where each such space serves to preheat the product, which is moved through the succession of subdivided spaces on a slideable conveyor, preparatory to receiving a higher heat intensity in the next succeeding subdivision, until lowest product peak heat stage is reached, then holding peak heat stage in a time cycle according to the number of subdivision spaces required at a given rate of travel therethrough by conveyor system to complete peak heat treatment, and thereafter deheating product in descending stages, one subdivision for each deheating stage until the product is brought back to room temperature. With sensors located in the terminal portion of product travel path in each subdivided space to control on temperature differentials as set, for product heating at control point, sensors extend dynamic control in a manner as follows; even heat generation as controlled for product heat condition at point of control, where sensors are located, to impart to product units moving from entrance into unit structure, or subdivision, to point of sensor location, heat an even volume although product heat is gradually building up therefrom in its movement through the structure, wherein said even heat supply forces environmental temperature, of the air medium, upward in a gradual manner along with, and just above, that of the gradually rising product heat level, thus to transfer heat evenly and in a tempering manner to said moving product units. Temperature and heat levels may be used as required up to the limit of heat levels for which the fan operation and transmission of heat by air or other vapors can be made to function. Many such uses as baking pottery, heat treating aluminum, drying and baking paints, and enamels, or various types of steel products may be accomplished at greater precision of heat control and at improved efficiencies otherwise such as adequate heat treatment in a shorter overall time period, less shrinkage and other imperfections and may be accomplished in a manner as described above for textile garments and products. Where heat and temperatures required may be for 1,000° F. or higher, special steels and alloys may be used for fan materials sufficient to withstand higher temperatures, and special metal or alloy or ceramic materials may be used for inner surfaces, baffles, etc. Certain specialized types of thermocouplings, and/or bellows-type thermostats may be substituted for thermistors as sensing elements. Various types of insulating materials suitable for higher heat levels may be used, such as ceramic or refractory insulating materials for inner surfaces, in combination with special type of glass in bubble form, where the objective is both to conserve heat within the enclosure and to protect the temperature in the room in which oven structure is located.

The compound sensing system for regulating both the flow of air and the volume of heat generated, for initial and ending temperatures of the airflow as it is to pass around heat treatment objects and transmit heat thereto may be used where heat generation occurs from the combustion of gas or other fluid fuels, but particularly gas, by substituting for the program switch as shown in FIG. 10, as used to switch in and out circuits of heaters to raise or decrease the amount of heat being generated from electric heating elements, a turn valve operation as shown at the right side in FIG. 10, where the opening and closing of the turnvalve is accomplished as impelled by control motor 23, as it turns pinion gear 46 to turn in one direction and move ring gear 34 in a counterclockwise direction to open the valve and increase the volume of fuel gas being supplied to gas burners, and thus increase the amount of heat being generated therefrom, and as motor 23 turns or rotates in the other direction to move ring gear 34 in a clockwise direction and thus decrease or close the volume of fuel gas permitted to flow through to burning jets, and thus decrease the amount of heat being generated therefrom.

Valve action is impelled in a manner as follows: two fingers 47 protrude from ring gear 34 through holes in the valve wheel which holes fit over said fingers 47 in a slideable manner and positioned to turn valve stem 48 in either direction on an axis which is common with that of ring gear 34, where valve stem 48 open and closes fluid screw valve, thus increasing and decreasing and cutting off fuel flow, all from operations as described in the foregoing for operation of program switch shown also in FIG. 10. Provision must be made for metal housings enclosing burning jets to include also fuel and air (to support combustion) through pipes, and space sufficient for gas fired combustion to take place and thus transmit heat to metal surface of housing, and where housing is to be provided with sufficient exhaust ports and piping therefrom to conduct exhaust fumes out of, and away from the housing in which the combustion occurs. Provision must also be made for even heat generation from jets, one linear inch with another linear inch of the housing enclosing combustion and components in support thereof, and for heat-generating jets to run the entire length of said metal housing containing combustion effects, where said housing must be inserted to run the entire length of heating jackets 7 as shown in FIG. 7 or heating jacket 14 as shown in FIG. 11 and FIG. 12, and must provide for even passageway for air around between housing and inner surfaces of heating jacket. And provisions must be made, also for fuel feed to each of plural metal housings as inserted in plural, heating jackets operative in one heating level to be even, one housing with that of another, so that an even flow of uniformly heated air will obtain through each respective combustion housing involved in one level.

I claim:

1. In an electric heating oven system, an oven casing, a fan rotatably mounted at the top of said casing, supporting means carried by said casing for supporting objects to be heated, electric heating elements mounted adjacent said objects to be heated, jackets comprising heat insulating baffle plates partially surrounding said heating elements and preventing direct radiation from said heating elements, electrically responsive temperature sensing elements mounted between said heating elements and said objects to be heated, air passages on the sides of said casing through which said fan drives currents of air from the top to the bottom of said casing, said supporting means being constructed so as to permit currents of air to pass upwardly therethrough, a source of electrical current, an electric motor mounted to drive said fan, first switch means connected for actuation by said temperature-sensing means and adapted to connect said electric power source to said motor, and second switch means connected for actuation by said temperature-sensing means and arranged to connect said power source to said electric heating elements, said heating elements being inserted on the walls of said casing, said system having wing formed jackets forming each an upward diverging trough at the top, and inverted diverging heel wings at the bottom, having baffle forms at each side on two sides of said jacket, and running from back as a cantilever to the front of the oven as detachably positioned from the back plate of the oven to form one unit of a series of spaced apart jackets horizontally disposed between the partitions, with the top right wing overlapping the top left wing of the next adjacent baffle plate having an air passageway therebetween, and with the bottom wing at each side with an air passageway intervening between it and the bottom wing of the next adjacent baffle plate at one side in such a manner as to otherwise enclose a heating jacket between adjacent two baffle plates, and having a layer of flexible heat insulating material protecting the outer exposed metal of the plate from through-metal conduction and radiation of heat from the inner metal surface exposed to electric heating coils enclosed herein, and having plural systems of such horizontally disposed baffle plates imposed as one series over another series between innermost partitions and each series enclosing heating coils therein, and controls responsive to temperature sensing for operating a compound temperature sensing and control operation for varying both the amount of heat generation and the quantity of air applied thereto to produce the volume of heat required at a given temperature level by heat absorption or withdrawal, by a given quantity dimension by content thereof of food cooking objects in the stream of air heated to initial temperature as sensed at a point between in the airflow as it comes out of said heaters and before it strikes the meat to temperature responsively regulate said airflow, and sensed also at a point in the air stream after it has passed the meat or other cooking objects and has delivered heat thereto temperature responsively regulating the volume of heat output for ending temperature of airflow, where the end heat volume plus the heat volume absorbed by the meat must exactly equal the heat volume as initially supplied for the compound sensing operations reacting against each other to come to equilibrium, enabling conditions which permit the compound sending method to function wherein, an oven enclosure with air circulation and even dispersal thereof with the oven, where there can be no transfer of heat to the food cooking objects and to inner surfaces and fittings outside the inner surfaces of the heating jackets except by passage of heated air thereon, thereby precluding heat radiation and conduction through metal to the food-cooking objects and heat to inadvertently become stored in metal mass to build up a temperature higher than that of the heated air under present temperature controls.

2. In a graduated variable heat output system, an oven casing, an axial fan with even draft propulsion blades rotably mounted in the top of said casing with a circle span of the heating space, means carried by said casing for supporting objects to be heated, plural circuits of electric heating elements, with schematized variance in heat output ratings for said elements between circuits, mounted below said objects to be heated, jackets comprising heat-insulating baffle plates partially surrounding each cluster of heating elements, each cluster of heating elements consisting of one set of elements from each of the plural circuits involved, said baffle plates preventing radiation from said heating elements, electrically responsive temperature sensing elements between said heating elements and objects to be heated, air passageways on the sides of said casing with even spaced separators therein serving individual spacially distributed baffle and heating element assemblies through which said fan drives currents of air from top to bottom of said casing, said supporting means being adapted to permit currents of air to pass upwardly therethrough, a graduated variable speed motor mounted to drive said motor, electrically responsive temperature sensing element mounted above objects to be heated and fan, and adapted to manipulate program switch to change switching power of field connections in fan motor, and position of connector on linear resistance, thus to vary in a graduated manner, the speed of fan motor, as the first switching means, and temperature-sensing controllers for actuating motor driven program switching means to actuate electromagnetic switching connections of power source to the various plural circuits of electric heating elements in combinations of plural circuits simultaneously, and each pair of sensing controllers having positioned at two sensing points for temperature responsive control of airflow and heat generation respectively to stabilize environmental temperature conditions throughout the heat treatment cycle as surface temperature of heating objects change during said cycle by use of any given temperature differential between said controls which may be suitable for heat treatment objectives.